US012057256B2

(12) United States Patent
Deng et al.

(10) Patent No.: US 12,057,256 B2
(45) Date of Patent: Aug. 6, 2024

(54) HIGH-FREQUENCY TRANSFORMER

(71) Applicants: GLOBAL ENERGY INTERCONNECTION RESEARCH INSTITUTE CO., LTD., Beijing (CN); STATE GRID CORPORATION OF CHINA, Beijing (CN); State Grid Shanghai Electric Power Co. Ltd, Shanghai (CN)

(72) Inventors: Zhanfeng Deng, Beijing (CN); Guoliang Zhao, Beijing (CN); Jun Ge, Beijing (CN); Guangyao Qiao, Beijing (CN); Xiaolin Mo, Beijing (CN); Dong Liang, Beijing (CN); Zhe Zhou, Beijing (CN)

(73) Assignees: GLOBAL ENERGY INTERCONNECTION RESEARCH INSTITUTE CO., LTD., Beijing (CN); STATE GRID CORPORATION OF CHINA, Beijing (CN); State Grid Shanghai Electric Power Co. Ltd., Shanghai (CN)

( * ) Notice: Subject to any disclaimer, the term of this patent is extended or adjusted under 35 U.S.C. 154(b) by 34 days.

(21) Appl. No.: 17/425,999

(22) PCT Filed: Aug. 28, 2018

(86) PCT No.: PCT/CN2018/102792
§ 371 (c)(1),
(2) Date: Jul. 27, 2021

(87) PCT Pub. No.: WO2019/227727
PCT Pub. Date: Dec. 5, 2019

(65) Prior Publication Data

US 2024/0120144 A1 Apr. 11, 2024

(30) Foreign Application Priority Data

May 30, 2018 (CN) ......................... 201810536292.9

(51) Int. Cl.
*H01F 27/28* (2006.01)
*H01F 27/24* (2006.01)
*H01F 30/12* (2006.01)

(52) U.S. Cl.
CPC ......... *H01F 27/2823* (2013.01); *H01F 27/24* (2013.01); *H01F 30/12* (2013.01)

(58) Field of Classification Search
CPC ....... H01F 27/2823; H01F 27/24; H01F 30/12
(Continued)

(56) References Cited

U.S. PATENT DOCUMENTS

2004/0135661 A1* 7/2004 Haugs ..................... H01F 29/14
336/212

FOREIGN PATENT DOCUMENTS

CN 104871265 A 8/2015
CN 204632527 U 9/2015
(Continued)

OTHER PUBLICATIONS

International Search Report in the international application No. PCT/CN2018/102792, mailed on Feb. 21, 2019.
(Continued)

*Primary Examiner* — Tszfung J Chan
(74) *Attorney, Agent, or Firm* — Syncoda LLC; Feng Ma

(57) ABSTRACT

A high-frequency transformer includes: an iron core, primary windings and secondary windings, wherein the iron core is of an integrated equilateral triangle structure, the primary windings and the secondary windings are uniformly wound around three sides of the iron core, and the primary
(Continued)

windings and/or the secondary windings are symmetrically distributed on the three sides.

8 Claims, 5 Drawing Sheets

(58) Field of Classification Search
USPC .............................................................. 336/5
See application file for complete search history.

(56) References Cited

FOREIGN PATENT DOCUMENTS

| | | | | |
|---|---|---|---|---|
| CN | 207503795 U | 6/2018 | | |
| CN | 208444720 U | 1/2019 | | |
| DE | 102011014521 A1 * | 9/2012 | ............ | B60L 11/182 |
| WO | WO-2009138098 A1 * | 11/2009 | ........... | H01F 27/245 |
| WO | 2014098271 A1 | 6/2014 | | |

OTHER PUBLICATIONS

Written Opinion of the International Search Authority in the international application No. PCT/CN2018/102792, mailed on Feb. 21, 2019.
"Substation Operation Site Technical Question and Answer the third edition", Zhang Quanyuan, Beijing: China Electric Power Press, 2013.02, pp. 402-403.

* cited by examiner

HIGH-FREQUENCY TRANSFORMER

CROSS-REFERENCE TO RELATED APPLICATIONS

This application is a U.S. national stage of International Application No. PCT/CN2018/102792 filed on Aug. 28, 2018, based upon and which claims priority to Chinese Patent Application No. 201810536292.9 filed on May 30, 2018. The disclosures of these applications are, the disclosure of which is hereby incorporated by reference in their its entirety.

TECHNICAL FIELD

The present disclosure relates to the technical field of transformers but is not limited to the technical field of transformers, and in particular to a high-frequency transformer.

BACKGROUND

A high-frequency transformer is a core device for an alternating current (AC)/direct current (DC) hybrid distribution network to realize AC/AC and DC/DC power transformation, and plays key roles in electrical isolation, voltage transformation, power transmission and the like between high and low voltage systems.

When magnetic circuits at an input terminal of a three-phase high-frequency transformer are asymmetrical, the fundamental component of a primary side cannot be counteracted and will be transferred to a secondary side, thereby increasing the loss of the high-frequency transformer.

An existing high-frequency transformer generally has a single-phase structure, an iron core is mainly formed by splicing rectangular or C-shaped iron cores, and a three-phase transformer cannot be realized on a single iron core. In order to realize a three-phase structure, three single-phase transformers need to be used to realize three-phase input, and three-phase iron cores are independent of each other, which can realize the symmetry of three-phase magnetic circuits on primary sides of the three-phase high-frequency transformer. However, due to the use of the three single-phase transformers, the three-phase high-frequency transformer is complicated in wiring, has large loss and has a large volume.

SUMMARY

The embodiments of the present disclosure provide a high-frequency transformer.

The present disclosure adopts the following technical solution.

The present disclosure provides a high-frequency transformer, which includes: an iron core, primary windings and secondary windings. The iron core is of an integrated equilateral triangle structure. The primary windings and the secondary windings are uniformly wound on three sides of the iron core, and the primary windings and/or the secondary windings are symmetrically distributed on the three sides.

In some embodiments, the secondary windings and the primary windings may be concentrically wound on the iron core, and the primary windings may be arranged outside the secondary windings.

In some embodiments, three corners of the iron core may be all of arc structures.

In some embodiments, the primary windings wound on the three sides of the iron core may be respectively configured for three-phase input; and the secondary windings wound on the three sides of the iron core may be of a series or parallel structure and may be configured for single-phase output.

In some embodiments, a plurality of iron cores may be provided; and the plurality of iron cores may be stacked.

In some embodiments, materials of the primary windings and the secondary windings may be copper foil or Litz wires.

In some embodiments, the primary windings and/or the secondary windings being symmetrically distributed on the three sides may include at least one of following scenarios:

- the primary windings are axisymmetrically distributed with any one of angle bisectors of a triangle;
- the primary windings are centrosymmetrically distributed around a center point of the triangle;
- the secondary windings are axisymmetrically distributed with any one of angle bisectors of the triangle; or
- the secondary windings are centrosymmetrically distributed around the center point of the triangle.

Compared with a related art, the technical solution of the present disclosure at least has the following advantages.

The embodiments of the present disclosure provide a high-frequency transformer. The high-frequency transformer includes: an iron core, primary windings and secondary windings. The iron core is of an integrated equilateral triangle structure, the primary windings and the secondary windings are uniformly wound on three sides of the iron core, and three-phase magnetic circuits of the primary windings are symmetrical. Fundamental wave magnetic circuits with a mutual difference of 120 degrees in the windings can be counteracted such that the loss caused by the transfer of the fundamental component of a primary side of the high-frequency transformer to a secondary side thereof is avoided. In addition, since only one transformer is used, the high-frequency transformer has low loss, is simple in wiring and has a small volume.

BRIEF DESCRIPTION OF THE DRAWINGS

In order to more clearly illustrate the specific embodiments of the present disclosure or the technical solutions in the related art, the drawings required in the description of the specific embodiments or the description of the related art are simply described below. Apparently, the drawings in the following description are some embodiments of the present disclosure, and a person of ordinary skill in the art can also obtain other drawings according to these drawings without any creative work.

DETAILED DESCRIPTION

The technical solution of the present disclosure will be clearly and completely described with reference to the drawings below. Apparently, the described embodiments are part of the embodiments of the present disclosure, rather than all of the embodiments. All other embodiments obtained by those of ordinary skill in the art based on the embodiments of the present disclosure without creative efforts fall within the scope of protection of the present disclosure.

It should be noted that the technical features involved in different embodiments of the present disclosure described below can be combined with each other as long as they do not conflict with each other.

The present disclosure provides a high-frequency transformer, which includes: an iron core, primary windings and secondary windings.

The iron core is of an integrated equilateral triangle structure.

The primary windings and the secondary windings are uniformly wound on three sides of the iron core, and the primary windings and the secondary windings are symmetrically distributed on the three sides.

If core bodies of the iron core are equivalent to sides of a triangle, the iron core may be an equilateral triangle.

The primary windings are symmetrically distributed on the three sides, and this symmetry is axial symmetry and/or central symmetry. The primary windings are symmetrically distributed on the three sides, so that three-phase magnetic circuits may be symmetrical.

In some embodiments, the secondary windings and the primary windings are concentrically wound on the iron core, and the primary windings are arranged outside the secondary windings.

In some embodiments, three corners of the iron core are all of arc structures.

In some embodiments, the primary windings wound on the three sides of the iron core are respectively configured for three-phase input; and the secondary windings wound on the three sides of the iron core are of a series or parallel structure and are configured for single-phase output.

Figure 3:
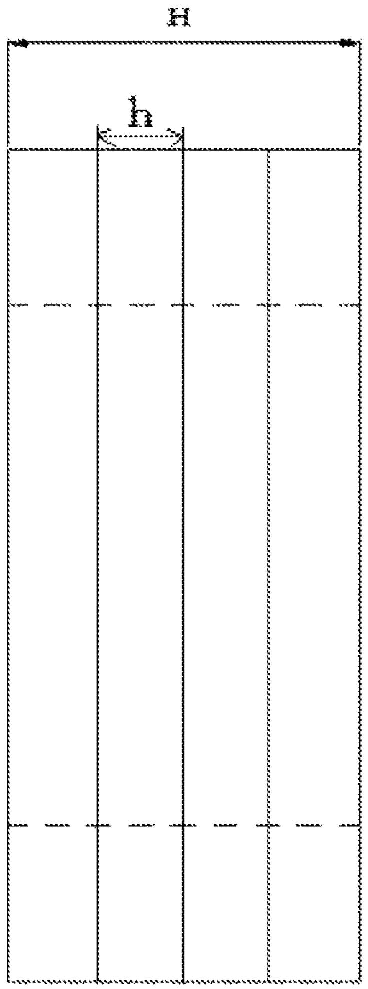
FIG. 3 is a side view of a specific example of a high-frequency transformer in an embodiment of the present disclosure.

In some embodiments, a plurality of iron cores are provided; and the plurality of iron cores are stacked. FIG. 3 shows four iron cores which are stacked, the four stacked iron cores form an iron core group, and the height of the iron core group is H. In FIG. 3, the height of each iron core participating in stacking may be h. In this way, four iron cores with an equilateral triangle structure are stacked to form an iron core with a height of H. The determination of the total height H of the iron core group requires comprehensive consideration of magnetic density, iron core loss, and transformer temperature rise and other factors. In this way, when the voltage transformation demand cannot be met by a single iron core, the voltage transformation demand can be met by an iron core group formed by a plurality of iron cores which are stacked.

The iron core group may include one iron core or more than one iron core.

In some embodiments, materials of the primary windings and the secondary windings are copper foil or Litz wires.

In some embodiments, the primary windings and/or the secondary windings are symmetrically distributed on the three sides, including at least one of following scenarios:

- the primary windings are axisymmetrically distributed with any one of angle bisectors of a triangle;
- the primary windings are centrosymmetrically distributed around a center point of the triangle;
- the secondary windings are axisymmetrically distributed with any one of angle bisectors of the triangle; or
- the secondary windings are centrosymmetrically distributed around the center point of the triangle.

The high-frequency transformer may be a transformer which can transform the alternating current with a frequency higher than a preset threshold.

Figure 1:
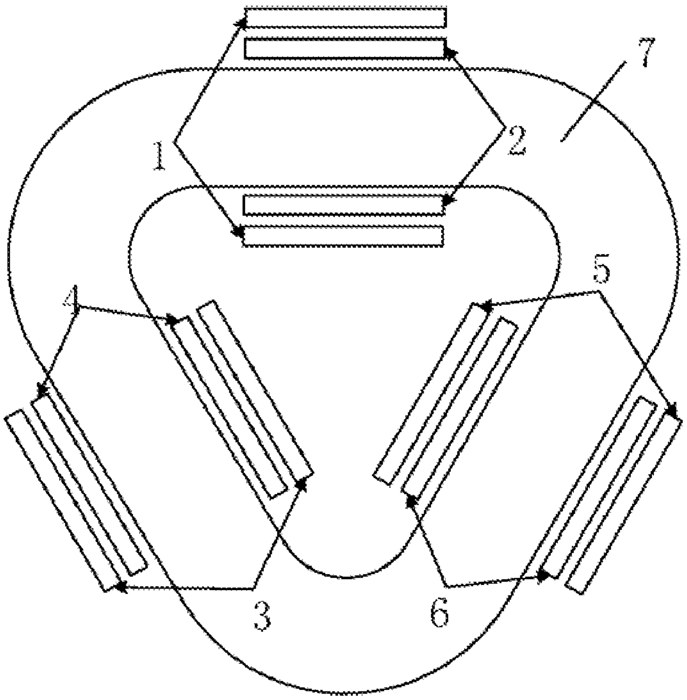
FIG. 1 is a schematic structural diagram of a specific example of a high-frequency transformer in an embodiment of the present disclosure.

The embodiments of the present disclosure provide a high-frequency transformer. As illustrated in FIG. 1, the high-frequency transformer includes: an iron core 7, a primary winding 1, a primary winding 3, a primary winding 5, a secondary winding 2, a secondary winding 4 and a secondary winding 6. The iron core 7 is of an integrated equilateral triangle structure. The primary winding 1, the primary winding 3, the primary winding 5, the secondary winding 2, the secondary winding 4 and the secondary winding 6 are uniformly wound on three sides of the iron core 7, and three-phase magnetic circuits of the primary winding 1, the primary winding 3 and the primary winding 5 are symmetrical.

The high-frequency transformer provided by the embodiments of the present disclosure uses only one transformer to realize the symmetry of three-phase input magnetic circuits of the primary side, the three phases share one core column, the fluctuating power can flow among the three phases of the primary side of the high-frequency transformer, the three phases of the primary side are completely coupled, and the fundamental wave magnetic circuits with a mutual difference of 120 degrees between the primary windings or between the secondary windings have a high degree of counteraction and can even be completely counteracted, thereby reducing or avoiding the loss of the high-frequency transformer caused by transfer to the secondary side. The high-frequency transformer is simple in wiring and has a small volume.

The core column may be a triangular ring formed by an iron core, and a triangular or approximately triangular hollow space is formed inside the core column. In this way, the primary windings and the secondary windings can be wound outside the iron core through the hollow space.

Furthermore, the iron core of the high-frequency transformer provided in the embodiments of the present disclosure is of an integrated structure, thereby avoiding the air gaps caused by splicing iron cores, reducing the leakage inductance of the high-frequency transformer and the loss of the iron core, reducing the hot spot temperature of the high-frequency transformer, improving the operating efficiency of the high-frequency transformer, and prolonging the service life of the high-frequency transformer.

As illustrated in FIG. 1, the secondary winding 2, the secondary winding 4 and the secondary winding 6 are wound on the iron core 7 concentrically with the primary winding 1, the primary winding 3 and the primary winding 5 respectively; and the primary winding 1, the primary winding 3 and the primary winding 5 are respectively arranged outside the secondary winding 2, the secondary winding 4 and the secondary winding 6. The primary winding 1, the primary winding 3 and the primary winding 5 are wound concentrically with the secondary winding 2, the secondary winding 4 and the secondary winding 6 respectively, thereby increasing the coupling coefficient between the primary and secondary windings, and effectively reducing the leakage reactance between the primary and secondary sides of the high-frequency transformer. u=L(di/dt), u represents voltage, L represents leakage reactance, and di/dt represents current change rate. The high-frequency transformer provided in the embodiments of the present disclosure is connected to a converter, and since the leakage reactance L between the primary and secondary sides is reduced, excessively high voltage spikes at high frequencies in the connected loop can be reduced.

Figure 2:
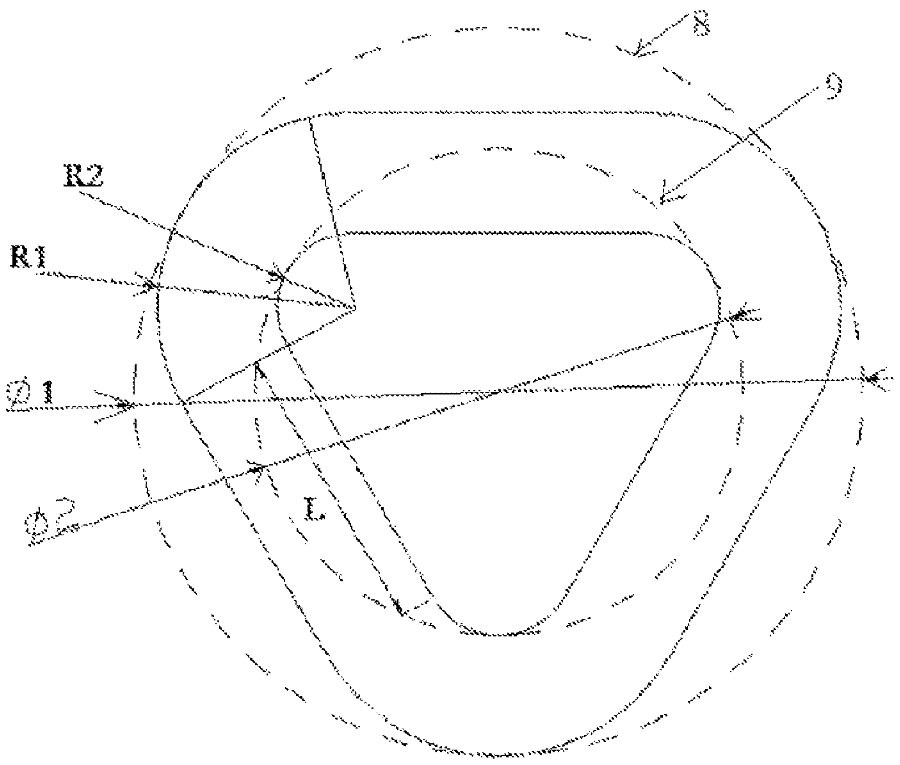
FIG. 2 is a schematic structural diagram of another specific example of a high-frequency transformer in an embodiment of the present disclosure.

As illustrated in FIG. 1 and FIG. 2, three corners of the iron core 7 are all of arc structures, so that on the one hand, the assembly required for an angle of 60 degrees is avoided, and on the other hand, the brittle fracture of the iron core is prevented. In addition, the straight length L of the three sides of the iron core, the inner triangular fillet radius R2 of the iron core, and the outer triangular fillet radius R1 of the iron core need to be comprehensively determined according to the width of the primary and secondary windings and the insulation requirements among three primary windings.

As the reference data when the iron core is made, as illustrated in FIG. 2, φ1 represents a diameter of a circle 8 where a triangular structure outside the iron core is disposed, and φ2 represents a diameter of a circle 9 where a triangular structure inside the iron core is disposed.

In an embodiment, in some embodiments of the present disclosure, the above iron core 7 may be formed by winding an iron core strip by an iron core winding machine and is subjected to annealing treatment. The iron core strip may be selected from different materials according to different working frequencies. For example, the iron core strip may be magnetic materials, such as ferrite, amorphous alloy, ultra-thin silicon steel, nanocrystal or the like.

Figure 4A:
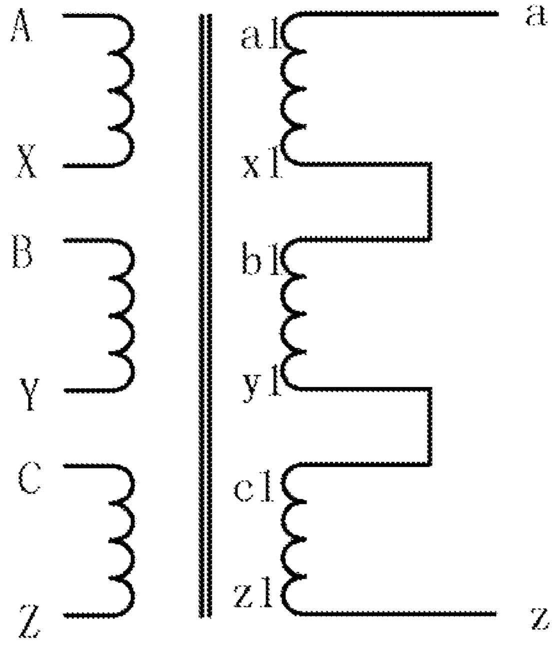
FIG. 4A is a schematic structural diagram of a specific example of secondary side series output of a three-phase to single-phase high-frequency transformer in an embodiment of the present disclosure.
Figure 4B:
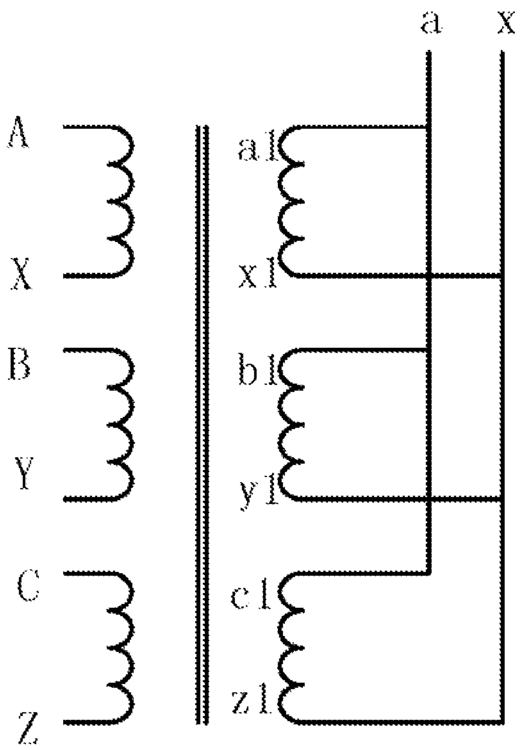
FIG. 4B is a schematic structural diagram of a specific example of secondary side parallel output of a three-phase to single-phase high-frequency transformer in an embodiment of the present disclosure.

In an embodiment, in some embodiments of the present disclosure, as illustrated in FIG. 4A and FIG. 4B, the primary winding 1, the primary winding 3 and the primary winding 5 wound on the three sides of the iron core 7 can be respectively configured for three-phase input, and each phase input includes two terminals (two terminals corresponding to the primary winding 1 are A and X, two terminals corresponding to the primary winding 3 are B and Y, and two terminals corresponding to the primary winding 5 are C and Z). As illustrated in FIG. 4A and FIG. 4B, the secondary winding 2(*a*1-*x*1), the secondary winding 4(*a*2-*x*2) and the secondary winding 6(*a*3-*x*3) wound on the three sides of the iron core 7 may be of a series or parallel structure, and two terminals are led out (two terminals led out in series are respectively a and z, and two terminals led out in parallel are respectively a and x), thereby realizing single-phase output. For a high-frequency square wave, three phases are the same, and a single-phase square wave with the same phase on the low-voltage side is induced, thereby realizing three-phase to single-phase transformation. By using the high-frequency transformer provided in the embodiments of the present disclosure, in the process of changing three phases to a single phase, the wiring is simplified, and the number of high-frequency transformers required is reduced at the same time.

In an embodiment, in order to reduce the skin effect under high-frequency working conditions, copper foil is used as the material of the above primary windings and secondary windings. By using the copper foil as the material for coiling the windings, the coiling difficulty of the windings is reduced.

In an embodiment, in other embodiments of the present disclosure, the above primary windings and secondary windings may also be Litz wires.

In an embodiment, in other embodiments of the present disclosure, insulating paper, insulating oil or epoxy resin can be used to realize electrical isolation between the primary and secondary sides.

Apparently, the above embodiments are only examples for clear explanation, but do not limit the embodiments. Those skilled in the art still can make other forms of changes or variations on the basis of the above explanation. All embodiments do not need to be and cannot be exhausted herein. The obvious changes or variations derived from this are still within the protection scope created by the present disclosure.

What is claimed is:

1. A high-frequency transformer, comprising: an iron core, primary windings and secondary windings;

wherein the iron core is of an integrated equilateral triangle structure, wherein the integrated equilateral triangle structure avoids air gaps caused by splicing the iron core; and the primary windings and the secondary windings are uniformly wound on three sides of the iron core, and the primary windings and/or the secondary windings are symmetrically distributed on the three sides;

wherein the secondary windings and the primary windings are concentrically wound on the iron core, and the primary windings are arranged outside the secondary windings;

wherein the primary windings wound on the three sides of the iron core are respectively configured for three-phase input; and the secondary windings wound on the three sides of the iron core are of a series or parallel structure and are configured for single-phase output.

2. The high-frequency transformer of claim 1, wherein three corners of the iron core are all of arc structures.

3. The high-frequency transformer of claim 1, wherein a plurality of iron cores are provided; and the plurality of iron cores are stacked.

4. The high-frequency transformer of claim 1, wherein materials of the primary windings and the secondary windings are copper foil or Litz wires.

5. The high-frequency transformer of claim 1, wherein the primary windings and/or the secondary windings being symmetrically distributed on the three sides comprises at least one of following scenarios:

the primary windings are axisymmetrically distributed with any one of angle bisectors of a triangle;

the primary windings are centrosymmetrically distributed around a center point of the triangle;

the secondary windings are axisymmetrically distributed with any one of angle bisectors of the triangle; or the secondary windings are centrosymmetrically distributed around the center point of the triangle.

6. The high-frequency transformer of claim 2, wherein a plurality of iron cores are provided; and the plurality of iron cores are stacked.

7. The high-frequency transformer of claim 2, wherein materials of the primary windings and the secondary windings are copper foil or Litz wires.

8. The high-frequency transformer of claim 2, wherein the primary windings and/or the secondary windings being symmetrically distributed on the three sides comprises at least one of following scenarios:

the primary windings are axisymmetrically distributed with any one of angle bisectors of a triangle;

the primary windings are centrosymmetrically distributed around a center point of the triangle;

the secondary windings are axisymmetrically distributed with any one of angle bisectors of the triangle; or the secondary windings are centrosymmetrically distributed around the center point of the triangle.

* * * * *